Aug. 14, 1934.   F. B. VOGDES   1,970,440
ELECTRIC TRANSLATING CIRCUITS
Filed June 1, 1932
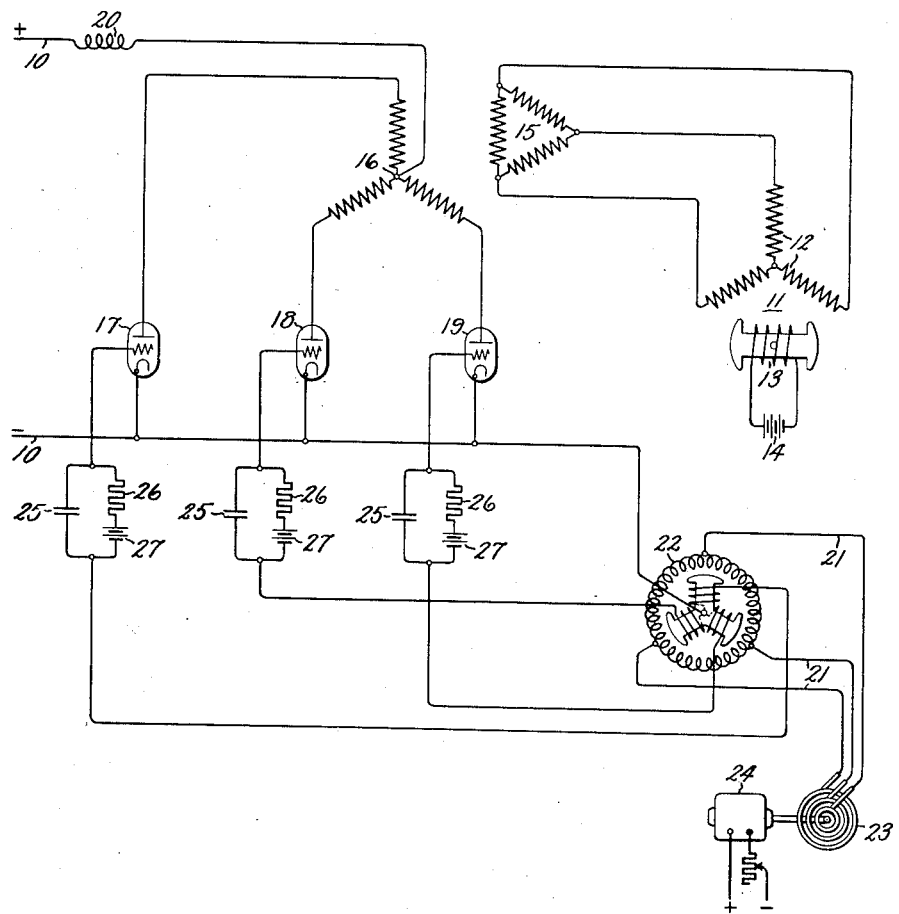
Inventor:
Francis B. Vogdes,
by Charles E. Mullen
His Attorney.

Patented Aug. 14, 1934

1,970,440

UNITED STATES PATENT OFFICE 1,970,440

ELECTRIC TRANSLATING CIRCUITS

Francis B. Vogdes, Plainfield, N. J., assignor to General Electric Company, a corporation of New York Application June 1, 1932, Serial No. 614,799

3 Claims. (Cl. 175—363)

My invention relates to electric translating circuits including an electric valve, and more particularly to such circuits adapted to operate over a wide range of frequencies.

In many electric translating circuits in which an electric valve is utilized for controlling the flow of current therein, the control grid of the electric valve is excited with an alternating potential for periodically rendering the valve conductive. In many instances the characteristics of the tube or the external circuit, such for example as when the valve is to conduct current for less than 180 electrical degrees, require that the grid circuit include also a source of negative bias potential. It has heretofore been proposed to produce this negative bias potential by connecting in the grid circuit a condenser and a resistor connected in parallel. With such an arrangement the rectified current flowing during the portions of the cycle in which the grid is positive with respect to the cathode stores a charge on the condenser, as is well understood by those skilled in the art. The resistor connected in parallel to the condenser serves as a leakage path for the charge on the condenser to prevent this charge from building up to excessive values. The average voltage appearing across the condenser will then be that at which an equilibrium is maintained between the charging current received by the grid rectification and the leakage current through the resistor. It is apparent that, with such an arrangement, if the frequency is increased, the successive charging impulses occur more frequently while the time allowed for the discharge condenser is correspondingly decreased so that the average bias voltage appearing across the condenser varies directly with the operating frequency. Hence, at very low frequencies an insufficient charge will remain on the condenser to produce the required bias potential.

It is an object of my invention to provide an improved electric translating circuit including an electric valve for controlling the flow of current therein, which will overcome the above mentioned disadvantages of the arrangements of the prior art and which will be simple and reliable in operation.

It is another object of my invention to provide an improved electric translating circuit operable at a variable frequency and including an electric valve for controlling the flow of current therein in which a sufficient negative bias potential will be maintained on the grid under all operating frequencies.

In accordance with one embodiment of my invention, an electric translating circuit operable at variable frequency is provided with a plurality of electric valves for controlling the flow of current therein. The connections are such that it is desirable for each valve to conduct current for approximately 120 electrical degrees. The grid of each of the electric valves is provided with a source of sinusoidal alternating potential for successively rendering the valves conductive and, in order to limit the period of conductivity of each valve to something less than 120 electrical degrees, there is included in each grid circuit a parallel-connected resistor and condenser. In order to provide a bias potential under very low operating frequencies when the bias potential across the condenser would be insufficient, an additional negative bias battery is included in the grid circuit. This bias battery may have a rating which is only a fraction of that which would be required for proper grid control under higher operating frequencies.

For a better understanding of my invention together with other and further objects thereof, reference is had to the following description taken in connection with the accompanying drawing and its scope will be pointed out in the appended claims. The single figure of the accompanying drawing illustrates my invention as applied to an arrangement for operating a three-phase synchronous motor at variable frequency from a source of direct current.

Referring now to the drawing, there is illustrated an arrangement for supplying energy from a direct-current circuit 10 to operate at a variable frequency an alternating-current motor 11, which may be of any of the several types well known in the art although I have illustrated by way of example a three-phase motor of the synchronous type comprising a three-phase armature winding 12 and a field winding 13 energized from any suitable source of direct current 14. This apparatus comprises a transformer provided with a three-phase secondary winding 15 connected to the armature 12 of the motor 11 and a three-phase Y-connected primary winding 16, the electrical neutral of which is connected to the positive side of the direct-current circuit and the several terminals of which are connected to the other side of the direct-current circuit through the electric valves 17, 18, and 19. A smoothing reactor 20 is preferably included in the direct-current circuit, as illustrated. Each of the electric valves 17, 18 and 19 is provided with an anode, a cathode and a control grid and may be of any of the several types well known in the art, although I prefer to use valves of the vapor electric discharge type. In order to render the electric valves 17, 18 and 19 successively conductive, their several grids are energized from any suitable alternating-current circuit 21 through a phase-shifting device 22. In case it is desired to operate the motor 11 at variable frequency, the circuit 21 may be energized from any suitable source of alternating potential of the frequency which it is desired to supply the motor 11, such for example as a pilot generator 23 driven by a variable speed motor 24. In the above arrangement, it is well understood by those skilled in the art, that each of the electric valves 17, 18 and 19 conduct current for substantially 120 electrical degrees so that the duration of the grid excitation of each of these valves should be something less than 120 electrical degrees. The duration of the positive grid excitation, which would normally be 180 electrical degrees, may be shortened by including in the grid circuit of each of the valves a source of negative bias potential which will decrease the positive portions of the sinusoidal wave of grid potential. Such a bias potential may be produced by including in each of the several grid circuits a condenser 25 connected in parallel with a high resistance device 26. When operating under very low frequencies, however, the charge on the condensers 25 tend to leak off through the resistors 26 during the intervals in which the condenser is not being charged, that is, during the intervals in which the grids of the several valves are negative. In order to maintain a negative bias on the grids under these conditions there is included in the grid circuit also the negative bias batteries 27. These batteries may be connected anywhere in the circuit but are illustrated as being connected in series with the resistors 26 which together are in parallel with the condensers 25.

The general principles of operation of the above described apparatus will be readily understood by those skilled in the art, or may be found explained in detail in United States Letters Patent No. 1,800,002, granted April 7, 1931, upon the application of E. F. W. Alexanderson. In brief, assuming that it is desired to operate the motor 11 at a particular speed, the motor 24 is adjusted to drive the pilot generator 23 at this speed and thus successively excite the valves 17, 18 and 19 at a corresponding frequency. Assume, for example, that electric valve 17 is rendered conductive at a particular instant. Substantially 120 electrical degrees later electric valve 18 is rendered conductive and the counter-electromotive force of the transformer winding 16 produced by the rotation of the motor 11 will be effective to transfer the current from the valve 17 to the valve 18. In this manner, the current is successively transferred between the several electric valves and the polyphase alternating current is delivered to the motor 11. By adjusting the speed of the motor 24, the control frequency of the several electric valves is varied to vary the speed of the motor 11 as desired: If only a sinusoidal electromotive force were impressed upon the grids of the several electric valves, each of them would be rendered conductive for 180 electrical degrees, while as brought out above, the period of conductivity of each must be limited to 120 electrical degrees so that the period of positive grid excitation must be something less than that value. With the condensers 25 and parallel-connected resistors 26 in the grid circuits, however, when a particular grid is positive it acts as an auxiliary anode of its respective valve and a rectified current flows in the grid circuit which charges up the condensers 25 with their lower terminals positive and their upper terminals negative as viewed in the drawing. When the impressed grid potential passes through zero the charge on the condenser acts as a negative bias which slowly decreases due to the leakage of the charge through the resistor 26. Under normal operating conditions a state of equilibrium is soon reached in which the charging of the condensers 25 during the periods of positive grid potential equals the discharge of the condensers during the periods of negative grid potential and the condensers 25 and resistors 26 are so proportioned that at this point the proper negative bias is introduced in the grid circuits. As stated above, however, at extremely low frequencies, the charging currents decrease while the discharging currents increase with a corresponding decrease in the average bias across the condenser 25, this bias approaching zero as the frequency approaches zero. The negative bias batteries 27, however, provide a source of negative bias potential under these conditions to insure a satisfactory operation of the apparatus. However, the rating of these bias batteries, which need be only sufficient for low frequency operating conditions, is considerably less than would be required under high frequency operating conditions. This is particularly true in case the electric valves are of the vapor electric type in which a relatively high negative bias is desirable for a rapid deionization of the valves.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In an alternating current electric translating circuit operable at a variable frequency and including an electric valve for controlling the flow of current therein, a control circuit for said valve including a source of alternating potential and a source of negative bias potential, and means for producing an additional negative control bias dependent upon the frequency of said alternating potential.

2. In a polyphase electric translating circuit operable at a variable frequency and including a plurality of electric valves for controlling the flow of current therein, said valves being arranged so that each is to conduct current substantially less than 180 electrical degrees of each cycle, a control circuit for each of said valves for rendering them successively conductive said circuit including a source of alternating potential, a parallel-connected condenser and resistor for producing a negative bias potential and limiting the conductivity of the associated valve to a period less than 180 electrical degrees, said bias potential varying in accordance with the operating frequency, and an additional source of constant bias potential for supplementing said first mentioned bias potential under low frequency operating conditions.

3. In combination, an electric translating circuit, an electric valve for controlling the flow of current in said circuit, said valve being provided with a control grid, and a control circuit for said grid including a source of alternating potential and a source of negative bias potential, and means for producing an additional negative control bias dependent upon the frequency of said alternating potential comprising a parallel-connected condenser and resistor included in said control circuit.

FRANCIS B. VOGDES.